US009004209B2

(12) United States Patent
Kontani et al.

(10) Patent No.: US 9,004,209 B2
(45) Date of Patent: Apr. 14, 2015

(54) FRONT AIR GUIDE STRUCTURE FOR A MOTORCYCLE

(71) Applicant: Honda Motor Co., Ltd., Tokyo (JP)

(72) Inventors: Masahiro Kontani, Wako (JP); Takahiro Sano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/964,163

(22) Filed: Aug. 12, 2013

(65) Prior Publication Data

US 2014/0090912 A1    Apr. 3, 2014

(30) Foreign Application Priority Data

Sep. 28, 2012    (JP) ................................. 2012-215513

(51) Int. Cl.
    *B60K 13/02*    (2006.01)
    *B62K 11/00*    (2006.01)
    *B62J 17/02*    (2006.01)

(52) U.S. Cl.
    CPC . *B62K 11/00* (2013.01); *B62J 17/02* (2013.01)

(58) Field of Classification Search
    USPC ............................................... 280/68.1–68.5
    See application file for complete search history.

(56) References Cited

U.S. PATENT DOCUMENTS

| 8,002,510 B2 * | 8/2011 | Williams ........................ 414/10 |
| 8,100,419 B2 * | 1/2012 | Morisset ...................... 280/79.7 |
| 2008/0268010 A1 * | 10/2008 | Ferris .............................. 424/422 |
| 2011/0095498 A1 * | 4/2011 | Morisset ...................... 280/79.7 |

FOREIGN PATENT DOCUMENTS

JP    10-035569 A    2/1998

\* cited by examiner

*Primary Examiner* — John Walters
*Assistant Examiner* — James Triggs
(74) *Attorney, Agent, or Firm* — Squire Patton Boggs (US) LLP

(57) ABSTRACT

In a motorcycle with a cowl, a bent portion which has an upright wall facing forwardly and is bent in an upward and downward direction is provided at an intermediate portion in a forward and backward direction of an air intake duct. A plurality of dewatering devices are provided, and configured to be hit from the front by traveling wind to remove moisture from the traveling wind. The dewatering devices are disposed at a plurality of locations in the air intake duct spaced from each other along the traveling wind flowing direction in the air passage in the front of the upright wall. An overall extent of a range in which the air passage can be seen up to a rear end thereof without obstruction when the air intake duct is viewed from the front of the traveling wind inlet is occupied by the dewatering devices.

19 Claims, 12 Drawing Sheets

FRONT AIR GUIDE STRUCTURE FOR A MOTORCYCLE

BACKGROUND

1. Field

The present invention relates to a motorcycle wherein an engine main body of an internal combustion engine is mounted on a vehicle body frame and a traveling wind inlet is provided in a front cowl supported on the vehicle body frame and disposed just above a front wheel and besides an air intake duct for taking in traveling wind from the traveling wind inlet from a front end thereof extends forwardly from an intake system of the internal combustion engine in such a manner as to form an air passage for introducing the traveling wind into the intake system, and particularly relates to improvements relating to a front air guide structure for guiding traveling wind to the intake system side of the internal combustion engine.

2. Description of the Related Art

A system wherein, in an air intake duct connecting to an intake system of an internal combustion engine, screen ribs for removing moisture from within traveling wind without reducing the supercharging pressure are provided is known from Patent Document 1 (Japanese Patent Laid-Open No. Hei 10-35569).

Incidentally, in a system wherein traveling wind is utilized as a supercharging pressure using such an air intake duct as described above, it is sometimes desired to increase the cross sectional area of the air passage in the air intake duct or the opening area of the traveling wind inlet in order to increase the supercharging air amount. However, if the cross sectional area of the air passage or the opening area of the traveling wind inlet is increased, then since also it is necessary to improve the dewatering performance for raindrops which flow in together with traveling wind, in the system disclosed in Patent Document 1 mentioned above, it is inevitable to form screen ribs positioned in the proximity of the traveling wind inlet in an increased size. However, if the screen ribs in the proximity of the traveling wind inlet are formed in an increased size, then there is the possibility that the flow resistance to traveling wind which flows in the air passage may become high.

SUMMARY

The present invention has been made in view of such a situation as described above. It is an object of the present invention to provide a front air guide structure for a motorcycle wherein, even if the cross sectional area of an air passage in an air intake duct is increased, a dewatering performance can be assured while the flow resistance to traveling wind is suppressed from becoming high.

According to embodiments of the present invention, a front air guide structure for a motorcycle is provided. An engine main body of an internal combustion engine is mounted on a vehicle body frame, and a traveling wind inlet is provided on a front cowl disposed just above a front wheel and supported on the vehicle body frame. An air intake duct for taking in traveling wind from the traveling wind inlet from a front end thereof extends forwardly from an intake system of the internal combustion engine in such a manner as to form an air passage for guiding the traveling wind to the intake system. A bent portion which has an upright wall facing forwardly and is bent in an upward and downward direction in such a manner as to assume an upper portion toward the rear is provided at an intermediate portion in a forward and backward direction of the air intake duct. A plurality of dewatering devices or means are disposed at a plurality of locations in the air intake duct spaced from each other along the traveling wind flowing direction in the air passage in the front of the upright wall. An overall extent of a range in which the air passage can be seen up to a rear end thereof without obstruction when the air intake duct is viewed from the front of the traveling wind inlet is occupied by the dewatering device or means.

In another embodiment, a second bent portion which has a forwardly inclined wall inclined rearwardly downwardly and facing forwardly and is bent in the upward and downward direction is provided at an upper portion of the air intake duct in the front of the upright wall, and the dewatering device or means are disposed in the front of the upright wall but in the rear of a front end of the forwardly inclined wall.

In another embodiment, the dewatering means are configured from screen ribs extending across the air passage between left and right inner side faces of the air passage, and the screen ribs spaced from an upper wall and a lower wall of the air passage are disposed in an offset relationship in the upward and downward direction such that the dewatering means partly overlap with each other as viewed from the traveling wind flowing direction.

In another embodiment, the screen rib which is disposed on the most upstream of the traveling wind flowing direction from between the screen ribs is formed so as to be directed to a drain hole provided at a lower portion of the air intake duct in the front of the upright wall.

In another embodiment, the screen rib which is disposed on the most downstream of the traveling wind flowing direction from between the screen ribs is formed in such a manner as to have a wing-shaped transverse sectional shape extending in the upward and downward direction.

In another embodiment, the screen ribs paired with each other are disposed so as to approach each other in the downward direction, and the upper wall of the air passage has, in a region in which the upper wall corresponds to the screen ribs, the forwardly inclined wall portion disposed above the screen rib on the upstream side and a rearwardly inclined wall portion extending in a rearwardly upwardly inclined relationship above the screen rib on the downstream side and connecting at a front end thereof to a rear end of the forwardly inclined wall portion.

In another embodiment, the screen rib which is disposed on the most upstream of the traveling wind flowing direction from between the screen ribs is provided contiguously to a partition wall which connects the lower wall and an upper wall of the air intake duct in such a manner as to partition the air passage leftwardly and rightwardly.

In another embodiment, the traveling wind inlet provided on the front cowl is formed such that a front end upper edge thereof is positioned, at the same position in the vehicle widthwise direction, at a position same in the forward and rearward direction as that of a front end lower edge of the traveling wind inlet or at a position in the front of the front end lower edge of the traveling wind inlet.

In another embodiment, the air intake duct has, at a rear end portion thereof, a pair of outlets into which the vehicle body frame is branched to the opposite left and right sides at a portion thereof corresponding to a head pipe provided at a front end portion of the vehicle body frame, and the bent portion which has the upright wall and the dewatering means is disposed in the front of the branching portion of the paired left and right outlets.

According to a first characteristic of the present invention, the bent portion which has the upright wall facing forwardly and is bent in the upward and downward direction is provided at the intermediate portion in the forward and backward direction of the air intake duct for supplying air introduced from the traveling wind inlet in the front cowl to the intake system of the internal combustion engine. Further, the dewatering means for removing moisture from the traveling wind are disposed at a plurality of locations spaced from each other along the traveling wind flowing direction in the front of the upright wall while the overall extent of the range in which the air passage can be seen up to the rear end thereof without obstruction when the air intake duct is viewed from the front of the traveling wind inlet is occupied by the dewatering means. Therefore, even if the transverse sectional area of the air passage is increased, the flow resistance to traveling wind is suppressed from becoming high thereby to assure the dewatering performance while the necessity to individually increase the size of the dewatering means is eliminated.

Further, according to another second characteristic of the present invention, the dewatering means are disposed in the rear of the front end of the forwardly inclined wall of the second bent portion provided at the upper portion of the air intake duct and in the front of the upright wall of the bent portion provided at the lower portion of the air intake duct. Therefore, dewatering by the dewatering means is promoted at the position at which the flowing direction of the traveling wind changes, and consequently, enhancement of the dewatering effect can be anticipated.

According to another characteristic of the present invention, the screen ribs extend across the air passage between the left and right inner side faces of the air passage and are spaced from the upper wall and the lower wall of the air passage so as to function as the dewatering means. The screen ribs are disposed in an offset relationship in the upward and downward direction such that they partly overlap with each other. Therefore, the location at which the flow of traveling wind changes in the upward and downward direction can be utilized to assure a dewatering performance by the screen ribs of a comparatively small size.

According to another characteristic of the present invention, the screen rib disposed on the most upstream of the traveling wind flowing direction is directed to the drain hole provided at the lower portion of the air intake duct in the front of the upright wall. Therefore, raindrops accompanied by traveling wind are guided effectively to the drain hole and drained from the drain hole, and a dewatering performance can be assured.

According to another characteristic of the present invention, the screen rib disposed on the most downstream of the traveling wind flowing direction has a wing-shaped transverse sectional shape extending in the upward and downward direction. Therefore, traveling wind can be guided so as to hit upon the upper wall of the air passage thereby to improve the dewatering performance.

According to another characteristic of the present invention, the screen ribs in pair are disposed so as to approach each other downwardly, and the upper wall of the air passage at the location at which it corresponds to the screen ribs is inclined rearwardly downwardly above the screen rib on the upstream side and is inclined rearwardly upwardly above the screen rib on the downstream side. Therefore, traveling wind can be guided so as to partly flow upwardly and downwardly between the screen ribs thereby to achieve improvement of the dewatering performance.

According to another characteristic of the present invention, the screen rib disposed on the most upstream is provided contiguously to the partition wall which connects the lower wall and the upper wall of the air intake duct in such a manner as to partition the air passage to the left and the right. Therefore, the rigidity of the screen rib on the most upstream can be assured.

According to another characteristic of the present invention, the front end upper edge of the traveling wind inlet provided in the front cowl is positioned, at the same position in the vehicle widthwise direction, at a position same as the position in the forward and rearward direction of the front end lower edge or at a position in the front of the front end lower edge. Therefore, when the motorcycle stops, rainwater from above is less likely to enter the traveling wind inlet.

According to another characteristic of the present invention, the air intake duct has, at the rear end portion thereof, the paired outlets branched to the opposite left and right sides, and the bent portion having the upright wall and the dewatering means is disposed in the front of the branching portion of the outlets. Therefore, while increase of the number of dewatering means is suppressed, the dewatering performance can be assured.

DETAILED DESCRIPTION

Figure 1:
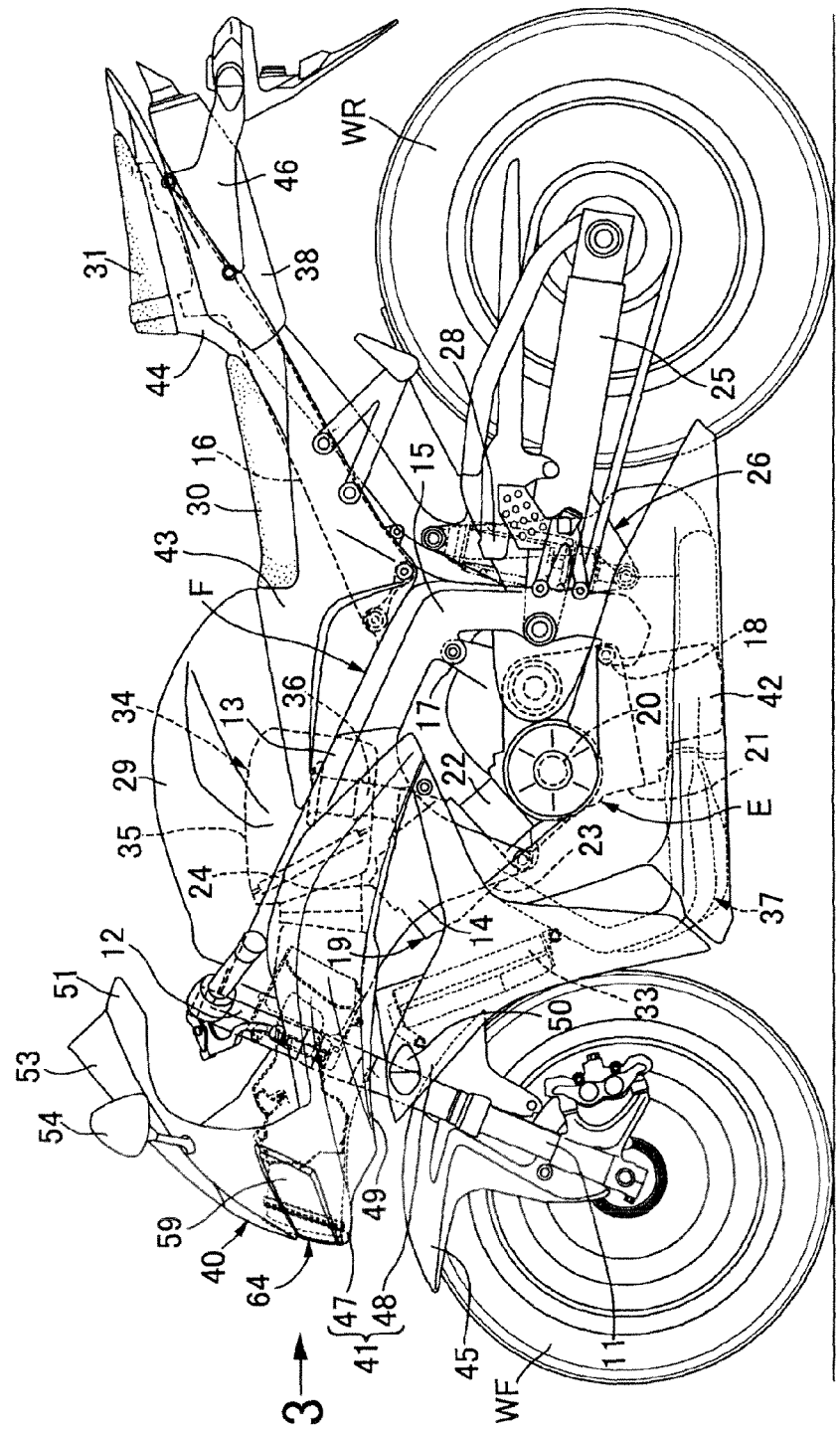
FIG. 1 is a side elevational view of a motorcycle according to embodiments of the invention.

Embodiments of the present invention is described with reference to FIGS. 1 to 12. Referring first to FIG. 1, a vehicle body frame F of a motorcycle includes a head pipe 12 for supporting a front fork 11, on which a front wheel WF is supported for rotation, for steering movement, and a pair of left and right main frames 13, 13 extending rearwardly downwardly from the head pipe 12. The vehicle body frame F further includes a pair of left and right engine hangers 14, 14 pendent downwardly from a front portion of the main frames 13, 13, and a pair of left and right pivot frames 15, 15 provided contiguously and integrally with a rear portion of the main frames 13, 13 and extending downwardly. The vehicle body frame F further includes a pair of left and right seat rails 16, 16 extending rearwardly upwardly from a rear portion of the main frames 13, 13.

Hanger portions 17, 17 are provided at a rear portion of the main frames 13, 13 of the vehicle body frame F, and hanger portions 18, 18 are provided at a lower portion of the pivot frames 15, 15. An engine main body 19 of an internal combustion engine E of the water-cooled type is supported at lower portions of the hanger portions 17, 17, hanger portions 18, 18 and engine hangers 14, 14 and disposed below the main frames 13, 13. A swing arm 25 is supported at a front end portion thereof for upward and downward rocking motion at a lower portion of the pivot frames 15, 15 and supports, at a rear end portion thereof, a rear wheel WR which is driven by power exerted by the internal combustion engine E. A link mechanism 26 is provided between a front portion of the swing arm 25 and a lower portion of the pivot frames 15, 15, and a rear cushion unit 28 is provided between the link mechanism 26 and an upper portion of the swing arm 25.

A fuel tank 29 is mounted on the main frames 13, 13 above the internal combustion engine E. A riding front seat 30 and a riding rear seat 31 are supported on the seat rails 16, 16. The riding front seat 30 is disposed behind the fuel tank 29, and the riding rear seat 31 is disposed behind the riding front seat 30.

The engine main body 19 of the internal combustion engine E includes a crankcase 21, a cylinder block 22, a cylinder head 23 and a head cover 24 and is configured, for example, as an in-line four-cylinder engine. The crankcase 21 supports a crankshaft 20, which has an axial line extending in a widthwise direction of the vehicle body frame F, for rotation thereon, and the cylinder block 22 extends forwardly upwardly from an upper end of a front portion of the crankcase 21. The cylinder head 23 is coupled to an upper end of the cylinder block 22, and the head cover 24 is coupled to an upper end of the cylinder head 23. A radiator 33 is disposed in the front of the engine main body 19 but in the rear of the front wheel WF and supported by a front portion of the vehicle body frame F.

An intake system 34 is connected to a side face of a rear portion of the cylinder head 23 and includes an air cleaner 35 covered with the fuel tank 29, and throttle bodies 36, interposed between the air cleaner 35 and the cylinder head 23 for individual cylinders. An exhaust system 37 is connected to a side face of a front portion of the cylinder head 23 and includes an exhaust muffler 38 at a rear end thereof. The exhaust muffler 38 is disposed above the rear wheel WR.

Figure 2:
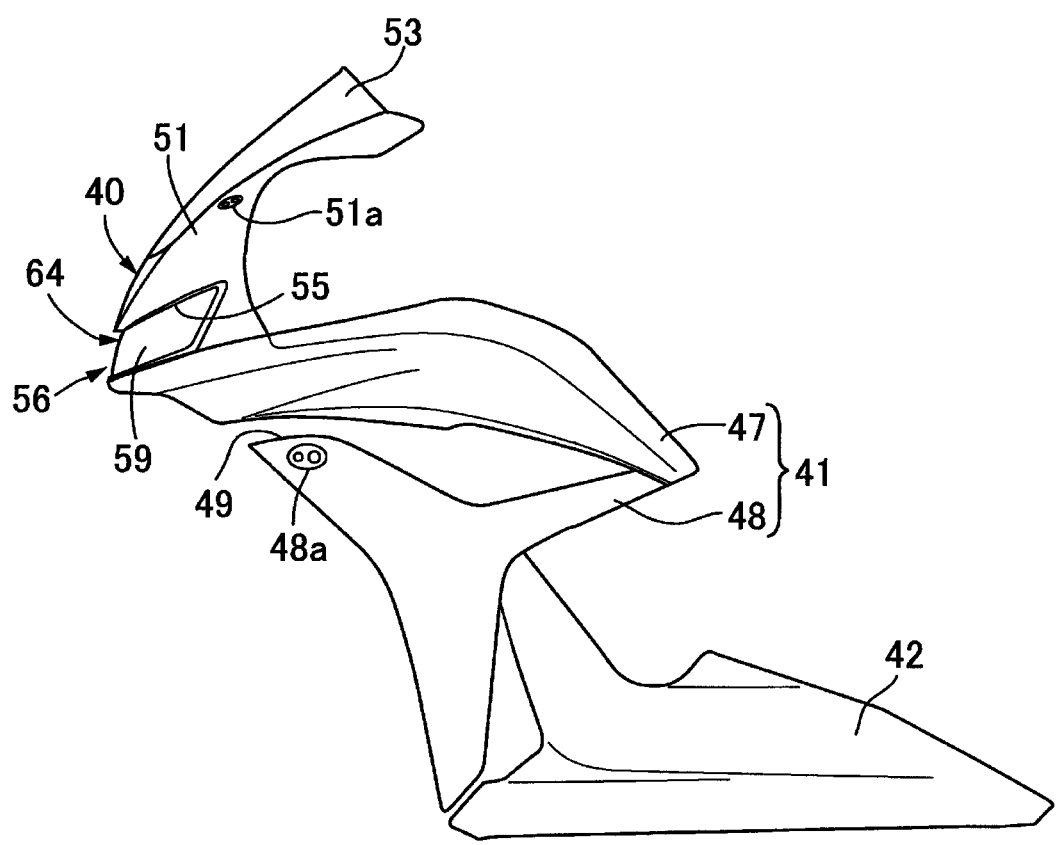
FIG. 2 is a side elevational view of an essential part of a cowling.
Figure 3:
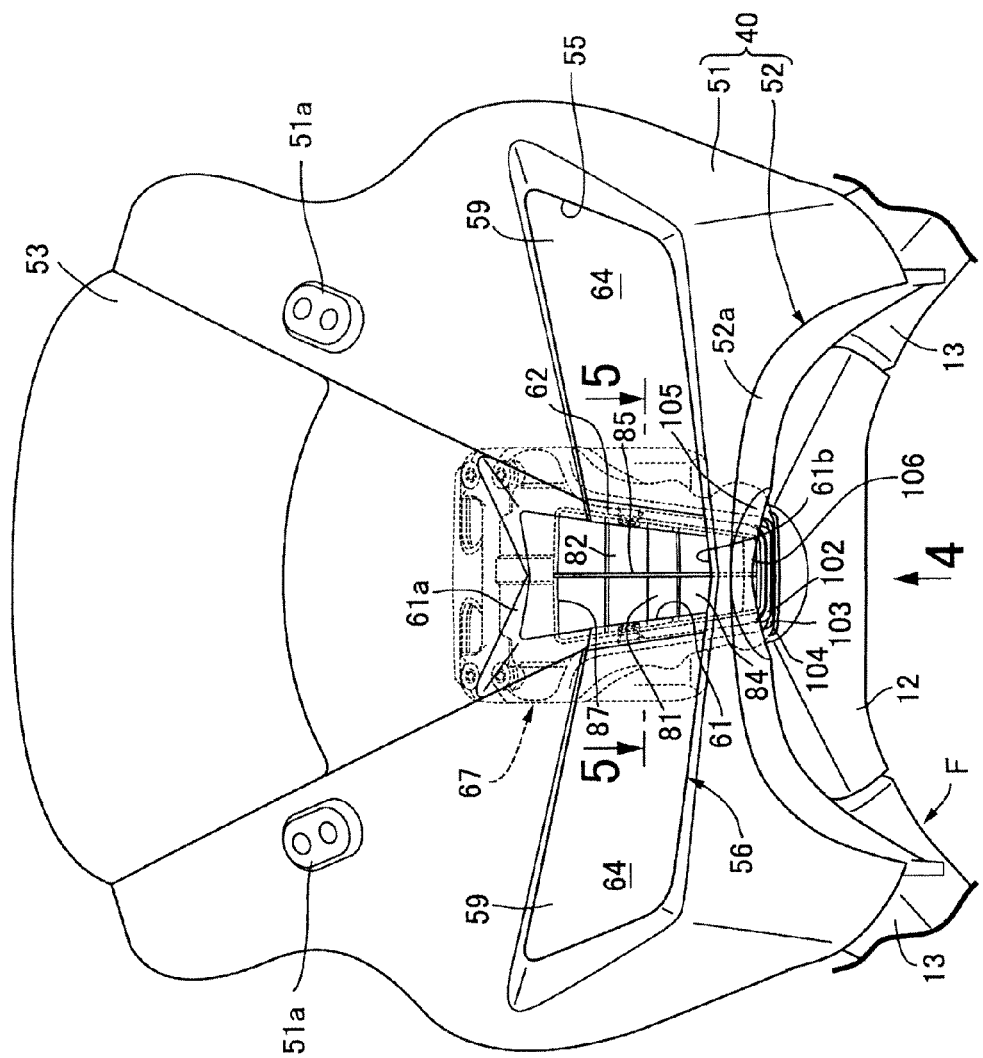
FIG. 3 is a view taken in a direction indicated by an arrow mark 3 of FIG. 1.

Referring also to FIGS. 2 and 3, the head pipe 12 at a front end portion of the vehicle body frame F is covered from the front with a front cowl 40 supported by the vehicle body frame F in such a manner as to be disposed just above the front wheel WF. A pair of left and right center cowls 41, 41 are provided contiguously to the opposite left and right sides of the front cowl 40 such that they cover a front portion of the vehicle body frame F and part of the internal combustion engine E from the sides. A pair of left and right lower cowls 42, 42 are provided contiguously to a lower portion of the rear side of the center cowls 41, 41 such that they cover a lower portion of the internal combustion engine E from the sides and from below and are joined to each other. Further, a pair of left and right side covers 43, 43 are provided between the fuel tank 29 and the riding front seat 30 such that they cover a lower portion of the rear side of the fuel tank 29 from the opposite sides. A rear cowl 44 is provided contiguously to a rear portion of the side covers 43, 43 and extends rearwardly upwardly.

A front fender 45 is supported on the front fork 11 such that it covers at least part of the front wheel WF from above. A rear fender 46 is supported at a rear portion of the seat rails 16, 16 such that it covers the rear wheel WR from above the rear side.

The center cowls 41 are configured from an upper cowl 47 provided contiguously to a rear portion of the front cowl 40 such that it covers a front portion of the vehicle body frame F from sidewardly, and a lower cowl 48 provided contiguously to a rear portion of the upper cowl 47. The lower cowl 48 is formed such that it covers the cylinder head 23 and the head cover 24 of the engine main body 19 and part of the exhaust system 37 of the internal combustion engine E as well as part of the radiator 33 from sidewardly. An opening 49 is formed between front portions of the upper cowl 47 and the lower cowl 48 such that it extends in the forward and backward direction across an upper portion of the radiator 33 as viewed in side elevation in order to guide traveling wind to the radiator 33 side. A direction indicator attaching seat 48a for attaching a direction indicator 50 (refer to FIG. 1) is formed at a front portion of the lower cowl 48.

Figure 4:
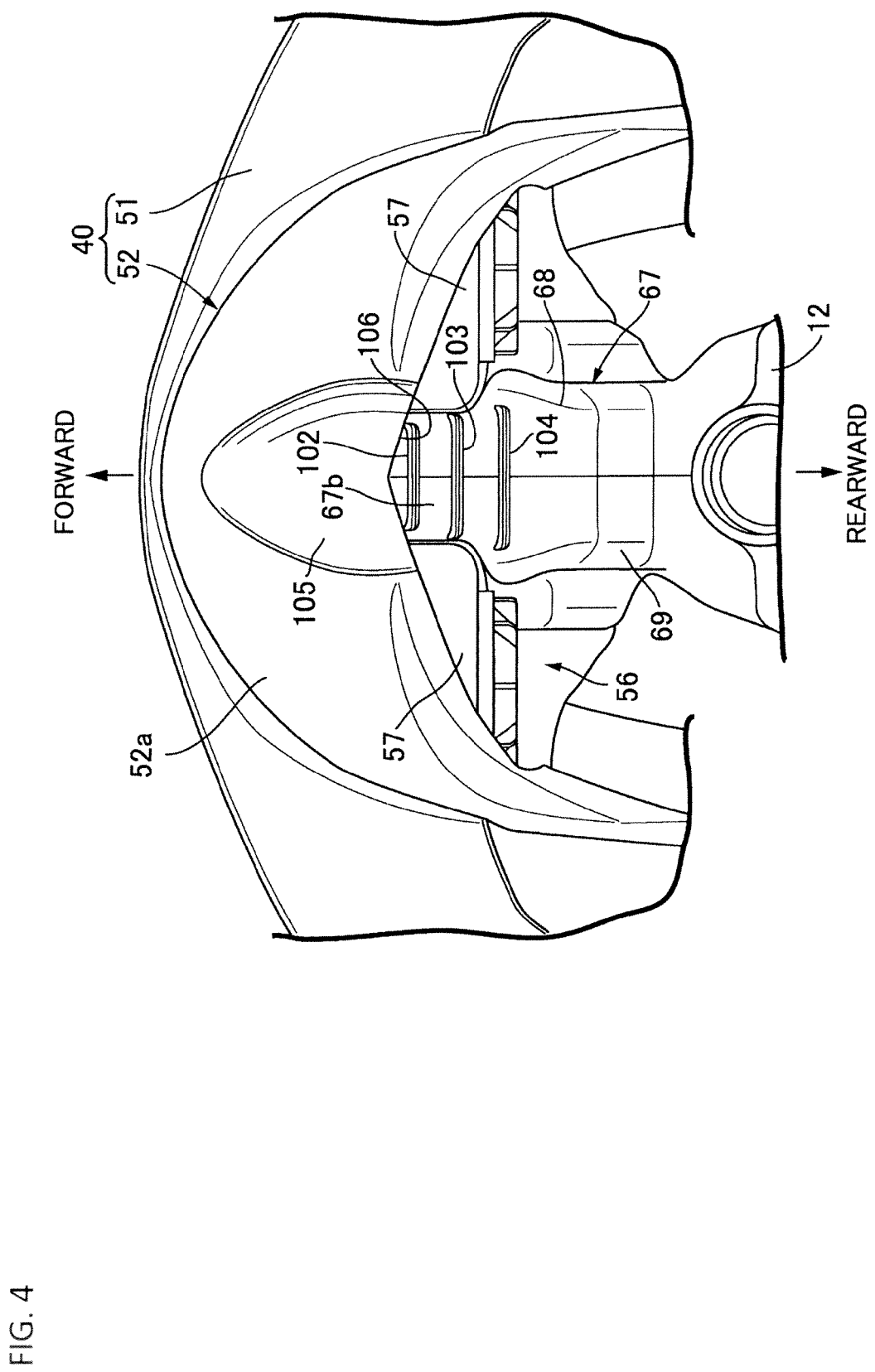
FIG. 4 is a view taken in a direction indicated by an arrow mark 4 of FIG. 3.

Referring also to FIG. 4, the front cowl 40 includes an outer cowl 51 formed in a substantially U shape in horizontal section, and an inner cowl 52 attached to an inner face of a lower portion of the outer cowl 51. A wind shield 53 is attached to an upper portion of a middle portion of the outer cowl 51. A pair of left and right mirror attaching seats 51a, 51a for attaching back mirrors 54, 54 (refer to FIG. 1) are formed on the outer cowl 51. The back mirrors 54, 54 are disposed on the opposite left and right sides of the wind shield 53.

An opening 55 is provided at a lower portion of a front face of the outer cowl 51 of the front cowl 40 such that it extends in the vehicle widthwise direction. A headlamp assembly 56 is disposed in the opening 55.

Figure 5:
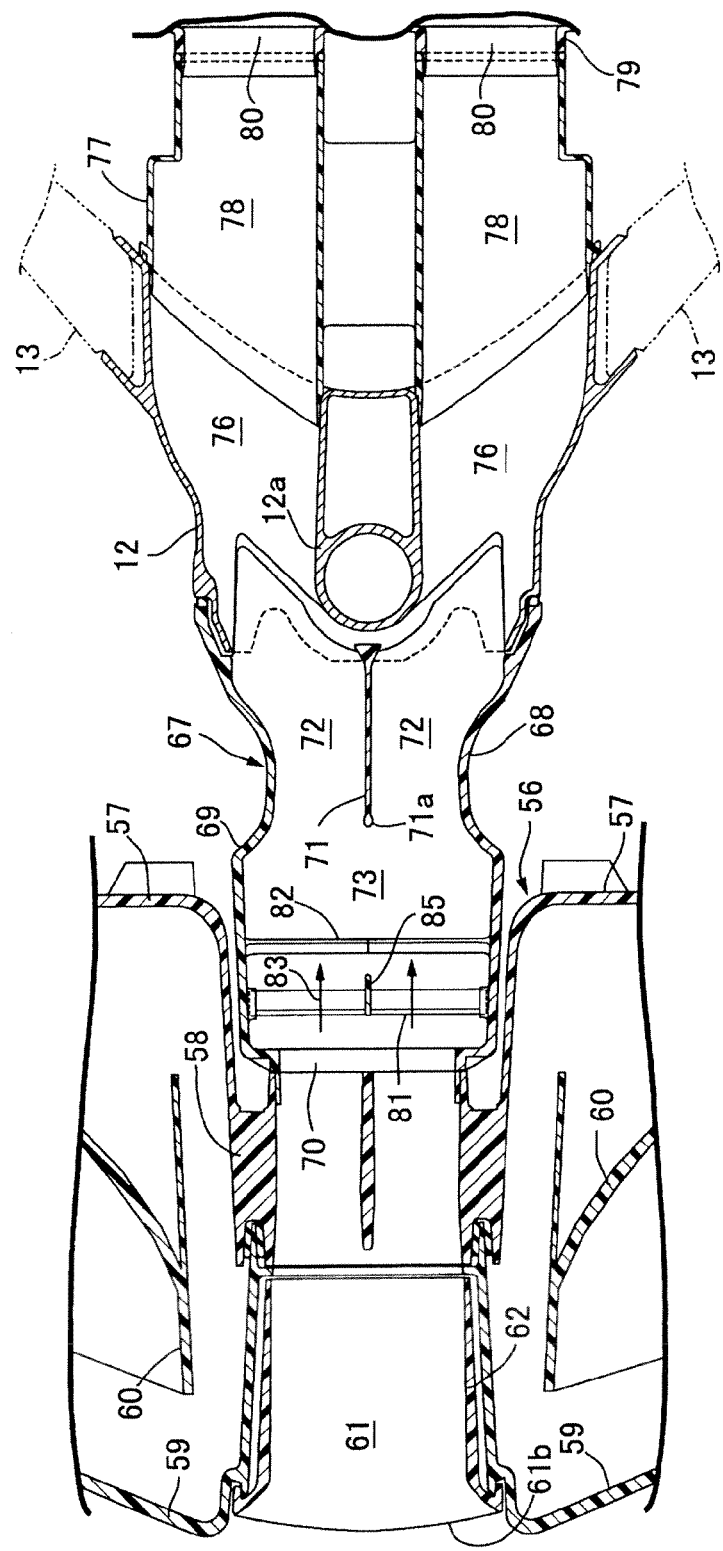
FIG. 5 is a sectional view taken along line 5-5 of FIG. 3.

Referring also to FIG. 5, the headlamp assembly 56 includes a pair of left and right light cases 57, 57 formed in a bowl shape open forwardly, a cylindrical connection portion 58 connecting the light cases 57, 57 to each other, and lenses 59, 59 attached to a front portion of the light cases 57, 57 in such a manner as to cover the open end of the light cases 57, 57. The headlamp assembly 56 further includes reflecting mirrors 60, 60 accommodated in the light cases 57, 57 and lenses 59, 59 paired with each other, and a lamp member (not shown) disposed at a central portion of the reflecting mirrors 60, 60. The headlamp assembly 56 is attached to the outer cowl 51 of the front cowl 40 in such a manner as to close up the opening 55.

Figure 6:
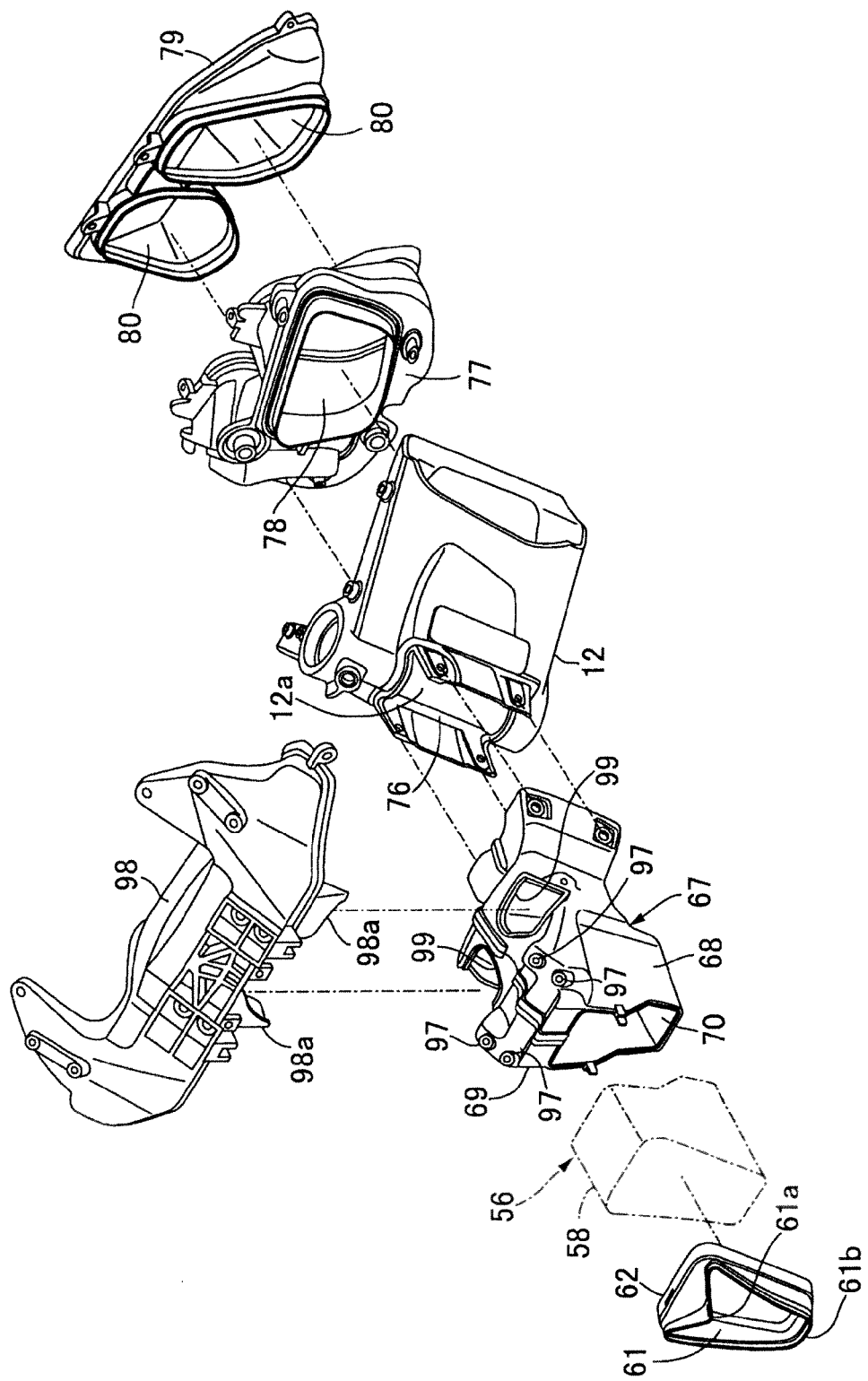
FIG. 6 is an exploded perspective view showing an air intake structure for guiding traveling wind introduced from a traveling wind inlet to an air cleaner.

Referring also to FIG. 6, a cylindrical traveling wind introduction tube 62 is disposed between the lenses 59, 59 and has a rear end portion thereof connected to a front end portion of the connection portion 58. The traveling wind introduction tube 62 forms a traveling wind inlet 61 open forwardly.

Headlamps 64, 64 are disposed on the opposite left and right sides of a front portion of the front cowl 40, and the traveling wind inlet 61 is provided at a front end portion of the front cowl 40 such that it is disposed between the headlamps 64, 64.

Figure 7:
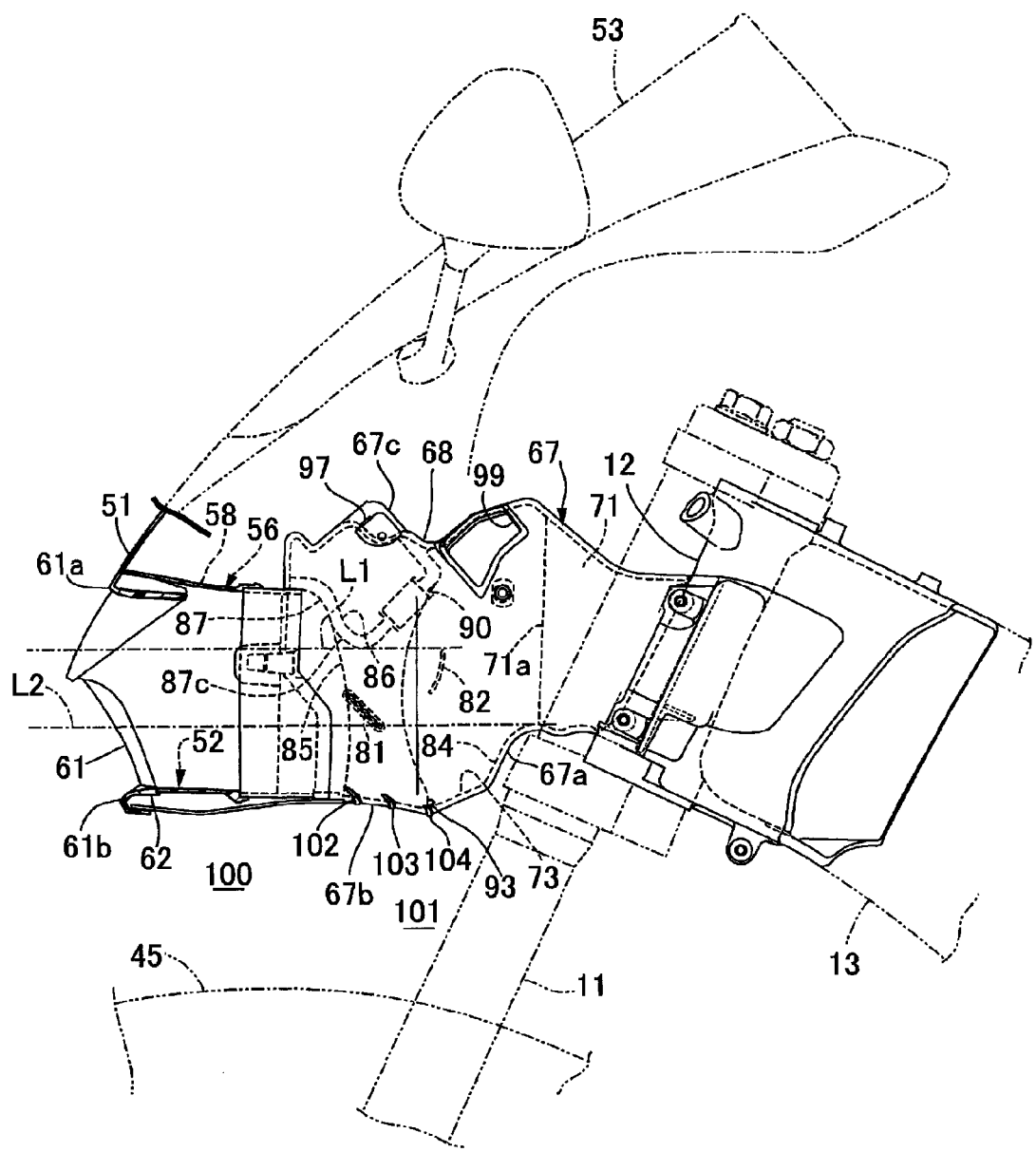
FIG. 7 is a side elevational view showing essential part of the air intake structure from the traveling wind inlet to a head pipe.
Figure 8:
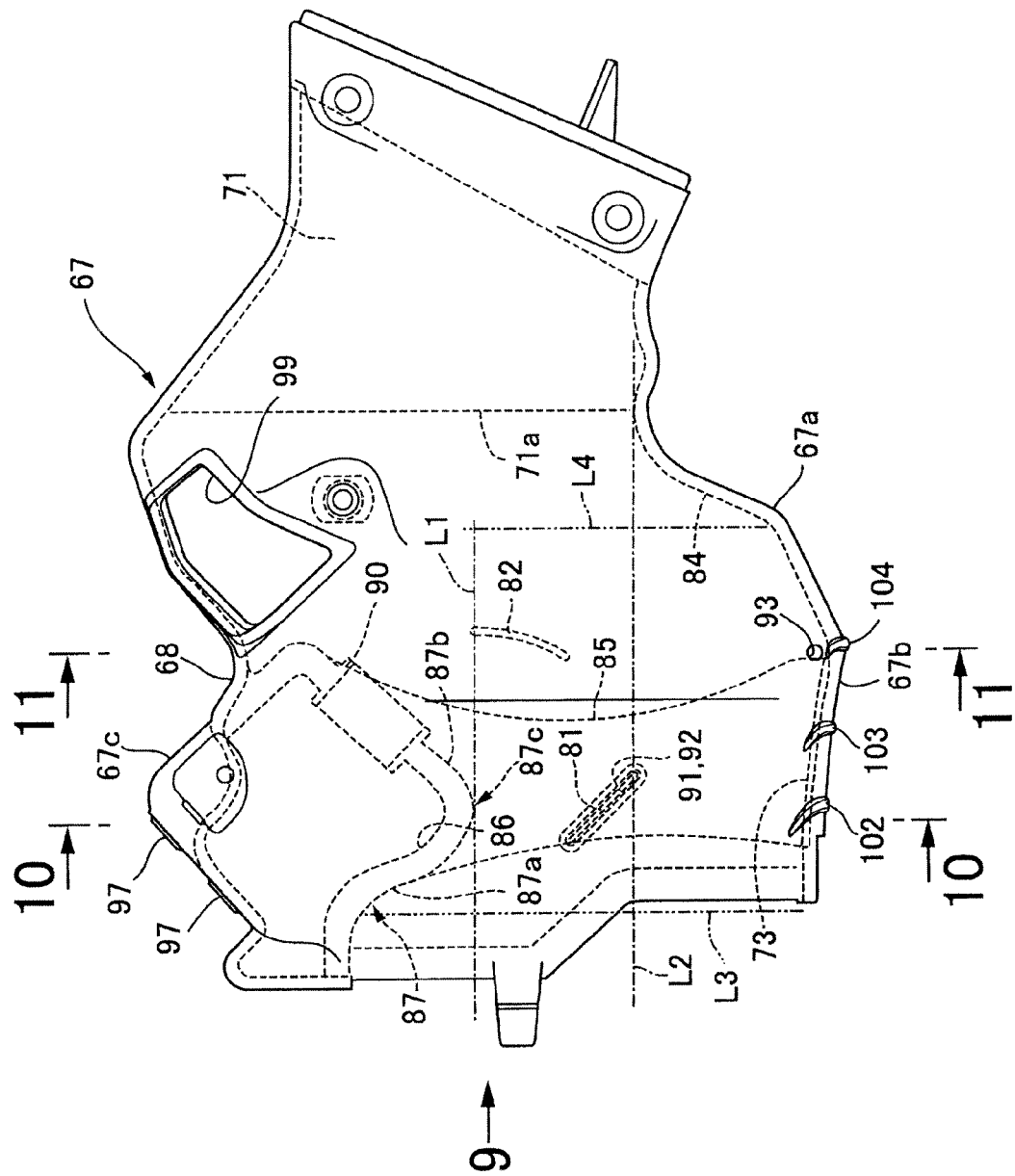
FIG. 8 is a side elevational view of an air intake duct.
Figure 9:
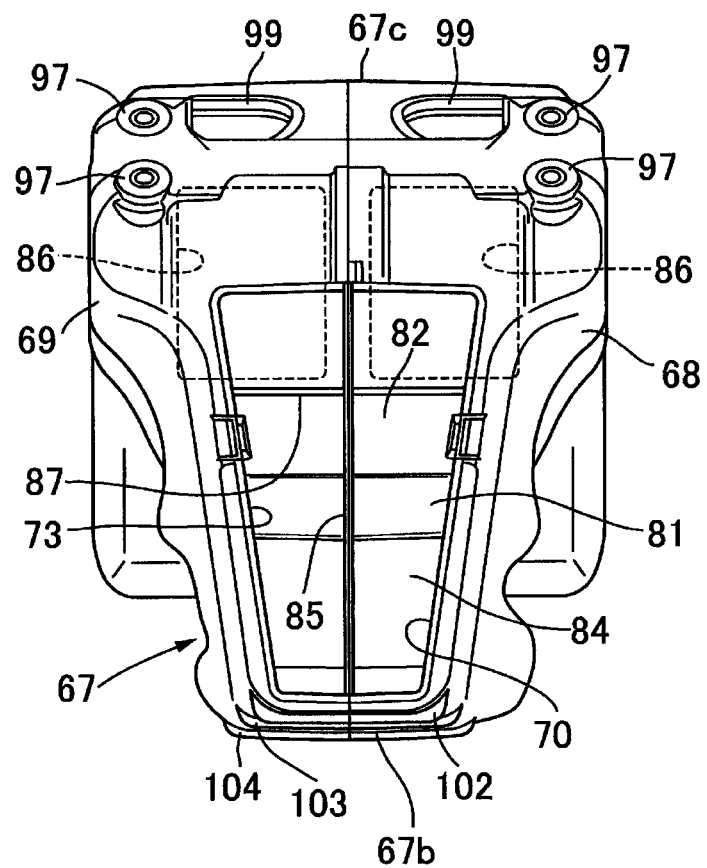
FIG. 9 is a front elevational view taken in a direction indicated by an arrow mark 9 in FIG. 8.
Figure 10:
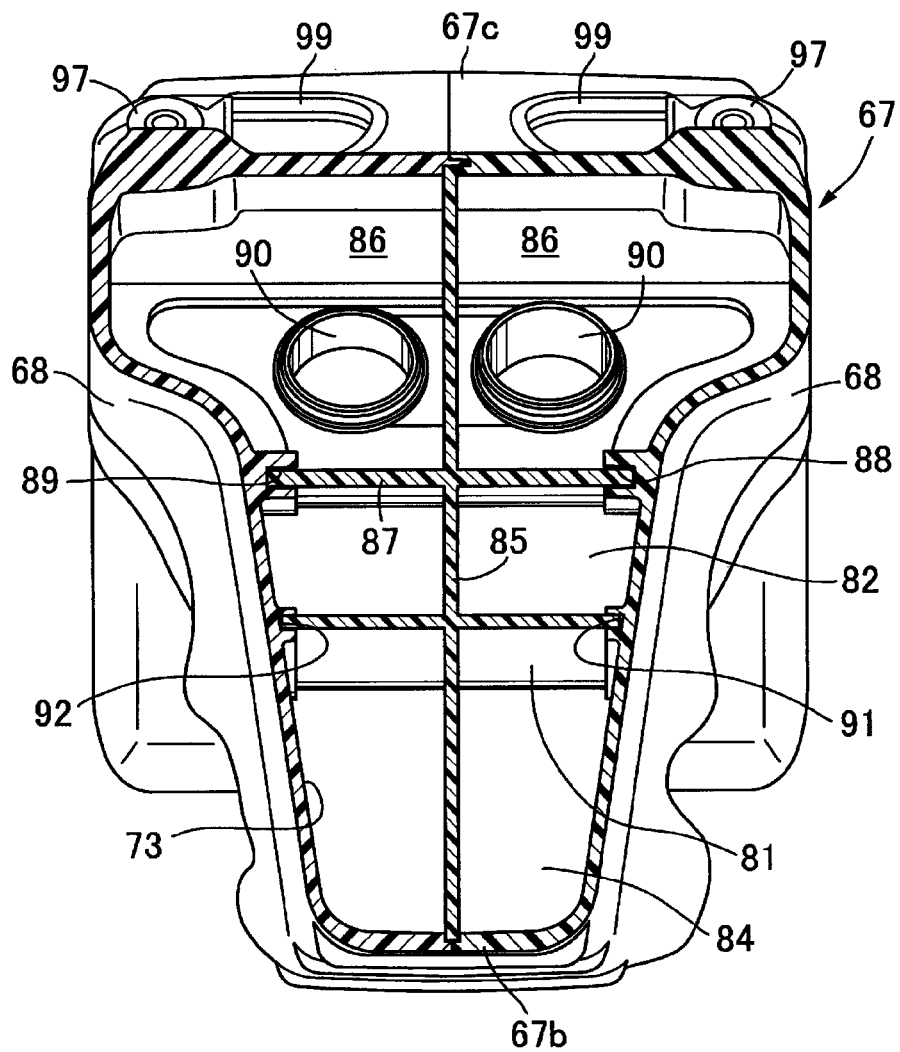
FIG. 10 is a sectional view taken along line 10-10 of FIG. 8.
Figure 11:
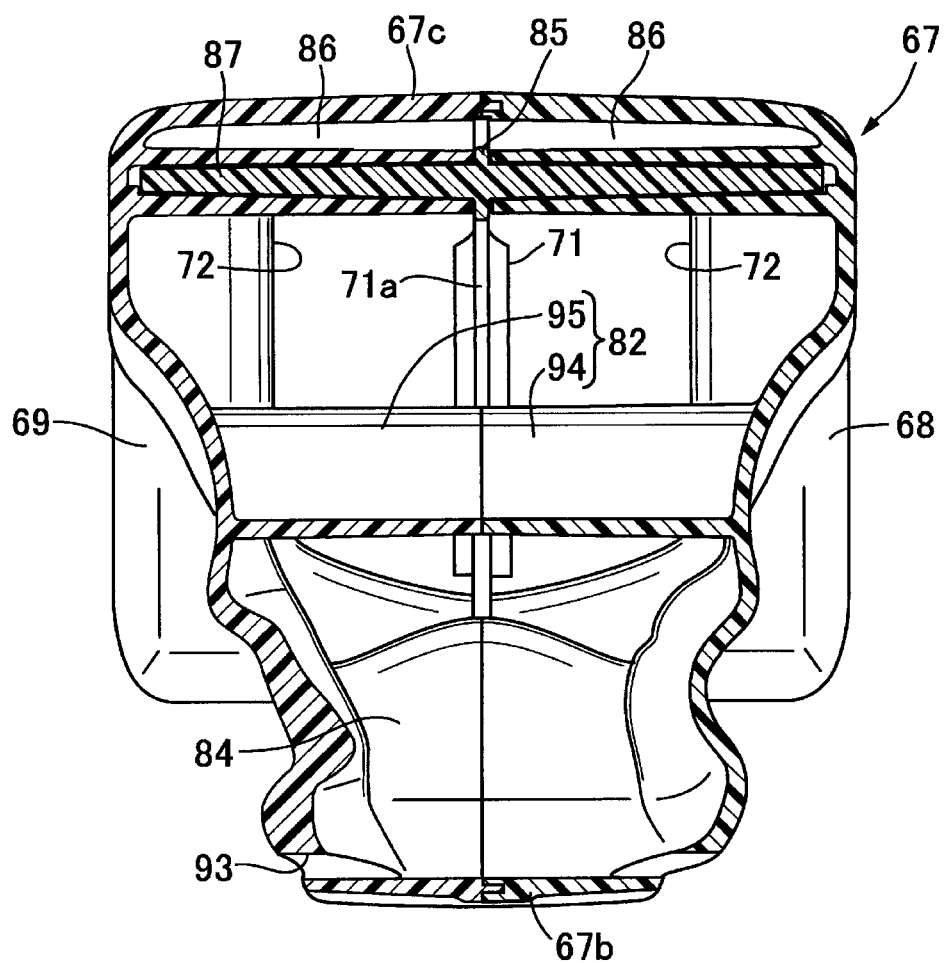
FIG. 11 is a sectional view taken along line 11-11 of FIG. 8.

Referring to FIG. 7, the traveling wind inlet 61 is formed such that a front end upper edge 61a thereof is positioned, at the same position in the vehicle widthwise direction, at a position in the forward and backward direction same as the position of a front end lower edge 61b of the traveling wind inlet 61 or positioned in the front of the front end lower edge 61b.

A single air intake duct 67 is disposed above the front fender 45. The air intake duct 67 is used to supply air introduced from the traveling wind inlet 61 provided at a front end portion of the front cowl 40 to the air cleaner 35 of the intake system 34 of the internal combustion engine E. The air intake duct 67 is accommodated at a front portion thereof in the front cowl 40.

Referring also to FIGS. 8 to 11, the air intake duct 67 is formed from a pair of left and right duct halves 68 and 69 coupled to each other and has a horizontal section of a rectangular shape. Besides, an inlet 70 is formed at a front end portion of the air intake duct 67 such that it connects to the rear side of the tubular connection portion 58 of the headlamp assembly 56, and a pair of left and right outlets 72, 72 are formed at a rear end portion of the air intake duct 67 in a region corresponding to the head pipe 12. An air passage 73 is formed in the air intake duct 67 and allows air introduced from the inlet 70 to flow to the outlets 72, 72.

A first partition wall 71 is disposed in a rear end portion of the air intake duct 67 such that it partitions the rear end portion of the air intake duct 67 to the left and the right. The first partition wall 71 is held at an upper end portion and a lower end portion thereof between the duct halves 68 and 69 which configure the air intake duct 67. The paired left and right outlets 72, 72 are formed at a rear end portion of the air intake duct 67 in such a manner as to be partitioned by the first partition wall 71.

The head pipe 12 of the vehicle body frame F has a supporting tubular portion 12a which supports the front fork 11 for steering movement and has a pair of left and right passages 76, 76 which are positioned on the opposite left and right sides of the supporting tubular portion 12a. The air intake duct 67 is connected at a rear end portion thereof to the head pipe 12 such that the outlets 72, 72 at a rear end portion of the air intake duct 67 are communicated with the passages 76, 76 on the opposite left and right sides of the supporting tubular portion 12a. The air intake duct 67 has, at a rear end portion thereof, a pair of outlets 72, 72 which are branched to the opposite left and right sides at a location corresponding to the head pipe 12.

The passages 76, 76 of the head pipe 12 are communicated with two left and right passages 78, 78 which a joint 77 has. The joint 77 is attached to the head pipe 12 from the rear. Further, an air introduction member 79 shown in FIG. 6 is connected to the joint 77. The air introduction member 79 is attached to the air cleaner 35 of the intake system 34, and the two passages 78, 78 of the joint 77 are communicated with two entrance passages 80, 80 which the air introduction member 79 has.

In the air intake duct 67, a plurality of, for example, two dewatering devices, namely, first and second screen ribs 81 and 82 which can act as dewatering means, are disposed at a plurality of locations, for example, at two locations, spaced from each other along a traveling wind flowing direction 83 in the air passage 73. The first and second screen ribs 81 and 82 are acted upon by traveling wind introduced from the traveling wind inlet 61 to remove moisture from the traveling wind. The left and right paired outlets 72, 72 are branched at the branching portion 71a which is a front end edge of the first partition wall 71, and the first and second screen ribs 81 and 82 are disposed in the air passage 73 in the front of the branching portion 71a.

A bent portion 67a is provided at an intermediate portion in the forward and backward direction of the air intake duct 67 in the front of the branching portion 71a. The bent portion 67a has an upright wall 84 facing forwardly and is bent in the upward and downward direction such that it assumes an upper position toward the rear. The first and second screen ribs 81 and 82 cross the air passage 73 between the left and right inner side faces of the air passage 73 in the front of the upright wall 84.

The first and second screen ribs 81 and 82 are disposed in an offset relationship in the upward and downward direction such that the first and second screen ribs 81 and 82 partly overlap with each other as viewed from the traveling wind flowing direction 83. In the present embodiment, the first and second screen ribs 81 and 82 are disposed such that an upper portion of the first screen rib 81 overlaps with a lower portion of the second screen rib 82 as viewed from the traveling wind flowing direction 83.

A second partition wall 85 is disposed in a front portion in the air intake duct 67 such that it connects a lower wall 67b and an upper wall 67c of the air intake duct 67 so as to partition the air passage 73 to the left and the right. The second partition wall 85 is sandwiched at an upper end portion and a lower end portion thereof between the duct halves 68 and 69 which configure the air intake duct 67.

A wall portion 87 is formed integrally at an upper portion of the second partition wall 85 and extends in the leftward and rightward direction such that a pair of left and right resonance chambers 86, 86 isolated from the air passage 73 are formed between the wall portion 87 and a front portion of the air intake duct 67. The wall portion 87 is fitted at the opposite left and right end portions thereof in supporting recessed portions 88 and 89 formed on inner side faces of the duct halves 68 and which configure the air intake duct 67. Further, communication pipes 90, 90 are formed integrally on the wall portion 87 such that they communicate the resonance chambers 86, 86 with the air passage 73.

Of the first and second screen ribs 81 and 82, the first screen rib 81 is disposed on the most upstream along the traveling wind flowing direction 83 and is provided contiguously to the second partition wall 85. In the present embodiment, the first screen rib 81 is formed integrally on the second partition wall 85 in such a manner as to extend from the second partition wall 85 to the opposite left and right sides. Besides, the first screen rib 81 is fitted at the opposite left and right end portions thereof with supporting recessed portions 91 and 92 formed on the inner side faces of the duct halves 68 and 69 which configure the air intake duct 67.

A drain hole 93 (refer to FIGS. 7 and 8) is provided at a lower portion of the air intake duct 67 in the front of the upright wall 84 of the bent portion 67a. The first screen rib 81 is formed in a rearwardly downwardly inclined relationship in such a manner as to be directed to the drain hole 93.

The second screen rib 82 is disposed on the downstream side with respect to the first screen rib 81 along the traveling wind flowing direction 83 and is formed so as to have a wing-shaped cross section extending in the upward and downward direction. Further, the second screen rib 82 is disposed in the rear of the second partition wall 85. The second screen rib 82 is formed from a pair of left and right ribs 94 and 95 provided contiguously and integrally with the inner side faces of the duct halves 68 and 69, which configure the air intake duct 67, and extend inwardly. When the duct halves 68 and 69 are coupled to each other, the inner ends of the ribs 94 and 95 contact with each other.

The first and second screen ribs 81 and 82 are disposed such that they approach each other in the downward direction. In particular, the first screen rib is formed in a rearwardly downwardly inclined relationship while the second screen rib 82 is formed in a curved form such that it is positioned forwardly in the downward direction.

The first and second screen ribs 81 and 82 are disposed in a spaced relationship from the upper wall and the lower wall of the air passage 73. The upper wall of the air passage 73 in which the first and second screen ribs 81 and 82 are provided is the wall portion 87 provided integrally on the second partition wall 85 while the lower wall of the air passage 73 is the lower wall 67b of the air intake duct 67.

The wall portion 87 which is the upper wall of the air passage 73 in a region in which it corresponds to the first and second screen ribs 81 and 82 is formed in a curved state in the upward and downward direction such that a second curved portion 87c curved in the upward and downward direction is formed. In particularly, the second curved portion 87c is configured from a forwardly inclined wall 87a inclined rearwardly downwardly above the first screen rib 81 on the upstream side and facing forwardly, and a rearwardly inclined wall 87b inclined rearwardly upwardly above the second screen rib 82 on the downstream side and connecting at a front end thereof to a rear end of the forwardly inclined wall 87a as clearly shown in FIG. 8. The second curved portion 87c is provided at an upper portion of the air intake duct 67 in front of the upright wall 84.

When the air intake duct 67 is viewed from the front of the traveling wind inlet 61 at a central portion of a front end of the front cowl 40, the range of the air passage 73 in which a rear end of the air passage 73 can be seen without obstruction is a range defined by a first horizontal line L1 (refer to FIGS. 7 and 8) which extends forwardly and backwardly past a lowermost portion of the wall portion 87 in the range in which the first and second screen ribs 81 and 82 are disposed, a second horizontal line L2 (refer to FIGS. 7 and 8) extending forwardly and backwardly past an upper end of the upright wall 84 of the bent portion 67a, and the left and right side walls of the air intake duct 67. The first and second screen ribs 81 and 82 are disposed such that they occupy the overall extent of the range in which the rear end of the air passage 73 can be seen without obstruction when it is viewed from the front of the traveling wind inlet 61. In particular, the first and second screen ribs 81 and 82 are disposed such that the first horizontal line L1 is positioned at or lower than an upper end of the second screen rib 82, which is positioned on the upper side between the first and second screen ribs 81 and 82 and the second horizontal line L2 is positioned at or higher than a lower end of the first screen rib 81, which is positioned on the lower side between the first and second screen ribs 81 and 82.

The first and second screen ribs 81 and 82 are disposed in the front of the upright wall 84 but in the rear of a front end of the forwardly inclined wall 87a. Further, the first and second screen ribs 81 and 82 are disposed between a first vertical line L3 which passes the front end of the forwardly inclined wall 87a and a second vertical line L4 which passes the front end of the upright wall 84.

Four stay fasting bosses 97 are provided in a projecting manner on the upper face of the air intake duct 67, and a meter stay 98 for attaching a meter not shown is fastened to the stay fasting bosses 97. The meter stay 98 has a pair of left and right hollow portions 98a, 98a, which are inserted in a pair of left and right insertion holes 99, 99 provided at an upper face of the air intake duct 67 in the rear of the resonance chambers 86, 86 such that they are communicated with the air passage 73 in the air intake duct 67. The hollow portions 98a, 98a function as an air reservoir. Upon sudden opening of the throttle or the like of the internal combustion engine E, air in the hollow portions 98a, 98a is temporarily supplemented into the air passage 73 thereby to moderate the negative pressure variation on the air passage 73.

At least part of the air intake duct 67, in the present embodiment, a front portion of the air intake duct 67, is accommodated in the front cowl 40 at a central location in the vehicle widthwise direction. A rear air guide passage 101 is formed between the air intake duct 67 and an upper face of the front fender 45 such that it connects from the rear to an air guide passage 100 formed between a bottom plate 52a of the front cowl 40 and an upper face of the front fender 45.

Air guide portions 102, 103 and 104 for guiding traveling wind toward the radiator 33 side are provided in a projecting manner on a lower face of at least a lowermost portion of the lower wall 67b of the air intake duct 67 and are disposed in the rear air guide passage 101. The air guide portions 102 to 104 are formed integrally on the lower wall 67b in such a manner as to project downwardly at positions spaced from each other in the forward and rearward direction.

A groove 105 is formed on a lower face of a central portion along the vehicle widthwise direction of the bottom plate 52a of the front cowl 40, and is concave upwardly and extends in the forward and rearward direction. The air guide portions 102 to 104 are disposed within a maximum width of the groove 105 as shown in FIG. 3 as viewed in front elevation of the vehicle.

A V-shaped recessed portion 106 is formed at a rear end of a central portion along the vehicle widthwise direction of the bottom plate 52a of the front cowl 40 and is concave forwardly as viewed in plan as depicted in FIG. 4. The air guide portions 102 to 104 are disposed in the recessed portion 106 as viewed in plan.

Operation of the present embodiment is described. The bent portion 67a is provided at an intermediate portion in the forward and backward direction of the air intake duct 67 which forms the air passage 73 and is bent in the upward and downward direction such that it has the upright wall 84 facing forwardly and assumes an upper position toward the rear. A plurality of, for example, two, first and second screen ribs 81 and 82 serving as dewatering means are disposed at a plurality of, for example, two, locations in the air intake duct 67 spaced from each other along the traveling wind flowing direction 83 in the air passage 73 in the front of the upright wall 84 such that the first and second screen ribs 81 and 82 occupy the overall extent of the range in which the air passage 73 can be seen up to the rear end thereof without obstruction when the air intake duct 67 is viewed from the front of the traveling wind inlet 61. Therefore, even if the transverse sectional area of the air passage 73 is increased, the necessity to individually increase the size of the first and second screen ribs 81 and 82 is eliminated thereby to suppress the flow resistance to traveling wind from becoming high while the dewatering performance is assured.

The second curved portion 87c is provided at an upper portion of the air intake duct 67 in the front of the upright wall 84, and has the forwardly inclined wall 87a inclined rearwardly downwardly and facing forwardly and is bent in the upward and downward direction. Further, the first and second screen ribs 81 and 82 are positioned in the front of the upright wall 84 but in the rear of the front end of the forwardly inclined wall 87a. Therefore, dewatering by the first and second screen ribs 81 and 82 is promoted at a position at which the flowing direction of traveling wind changes, and consequently, enhancement of the dewatering effect can be anticipated.

The first and second screen ribs 81 and 82 extend across the air passage 73 between the left and right inner side faces of the air passage 73. The first and second screen ribs 81 and 82 spaced from the wall portion 87 which is an upper wall of the air passage 73 and the lower wall 67b are disposed in an offset relationship in the upward and downward direction such that the first and second screen ribs 81 and 82 partly overlap with each other as viewed from the traveling wind flowing direction 83. Therefore, the location at which the flow of traveling wind changes in the upward and downward direction can be utilized to assure a dewatering performance by the first and second screen ribs 81 and 82 of a comparatively small size. Consequently, the traveling wind can flow between the first and second screen ribs 81 and 82 such that the flowing resistance to the traveling wind can be suppressed.

The first screen rib 81 disposed on the most upstream of the traveling wind flowing direction 83 from between the first and second screen ribs 81 and 82 is formed such that it is directed to the drain hole 93 provided at a lower portion of the air intake duct 67 in the front of the upright wall 84. Therefore, raindrops accompanied by traveling wind are guided effectively to the drain hole 93 and drained from the drain hole 93, and a dewatering performance can be assured.

The second screen rib 82 disposed on the most downstream of the traveling wind flowing direction 83 from between the first and second screen ribs 81 and 82 is formed such that it has a wing-shaped transverse sectional shape extending in the upward and downward direction. Therefore, traveling wind can be guided so as to hit upon the upper wall of the air passage 73 by the second screen rib 82 thereby to improve the dewatering performance.

The first and second screen ribs 81 and 82 are disposed so as to approach each other downwardly, and the wall portion 87 which serves as the upper wall of the air passage 73 at a location at which it corresponds to the first and second screen ribs 81 and 82 is formed such that it has the forwardly inclined wall 87a inclined rearwardly downwardly above the first screen rib 81 on the upstream side and the rearwardly inclined wall 87b inclined rearwardly upwardly above the second screen rib 82 on the downstream side and connecting at the front end thereof to the rear end of the forwardly inclined wall 87a. Therefore, traveling wind can be guided so as to partly flow upwardly and downwardly between the first and second screen ribs 81 and 82 thereby to achieve improvement of the dewatering performance.

The first screen rib 81 disposed on the most upstream of the traveling wind flowing direction 83 from between the first and second screen ribs 81 and 82 is provided contiguously to the second partition wall 85 which connects the lower wall 67b and the upper wall 67c of the air intake duct 67 in such a manner as to partition the air passage 73 to the left and the right. Therefore, also the rigidity of the first screen rib 81 can be assured.

The traveling wind inlet 61 is formed such that the front end upper edge 61a thereof is positioned, at the same position in the vehicle widthwise direction, at a position same as the position in the forward and rearward direction of the front end lower edge 61b of the traveling wind inlet 61 or at a position in the front of the front end lower edge 61b. Therefore, when the motorcycle stops, rainwater from above is less likely to enter the traveling wind inlet 61.

Figure 12:
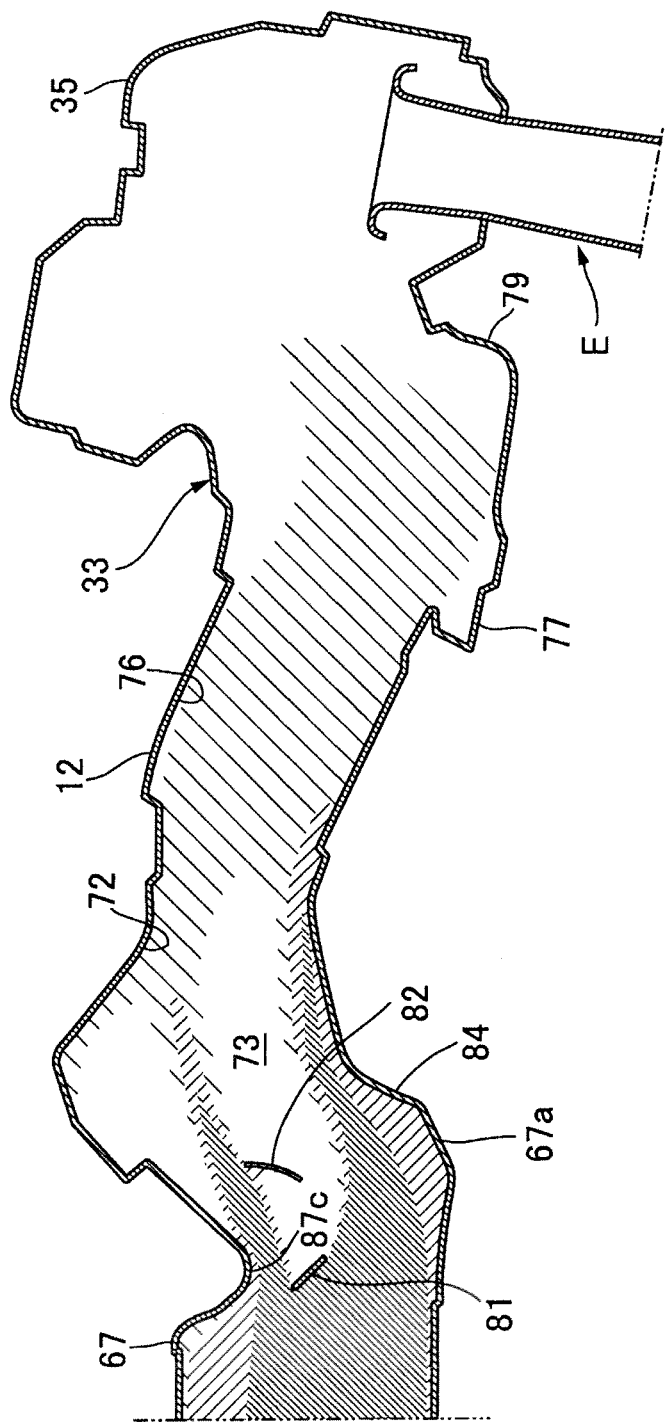
FIG. 12 is a view illustrating a pressure distribution from the air intake duct to an intake system.

Furthermore, the air intake duct 67 has, at a rear end portion thereof, the paired outlets 72, 72 branched to the opposite left and right sides at the location corresponding to the head pipe 12 provided at a front end portion of the vehicle body frame F, and the bent portion 67a having the upright wall 84 and the first and second screen ribs 81 and 82 are disposed in the front of the branching portion 71a of the paired left and right outlets 72, 72. Therefore, while increase of the number of screen ribs serving as the dewatering means is suppressed, the dewatering performance can be assured.

Where the air intake duct 67 in accordance with embodiments of the present invention is used, the pressure distribution within a range from the air intake duct 67 to the radiator 33 of the internal combustion engine E after the first and second screen ribs 81 and 82 are passed is, according to an experiment by the inventor of the present application, such as illustrated in FIG. 12. In FIG. 12, the pressure distribution is indicated by three stages such that the higher the density of slanting lines, the higher the pressure. According to the pressure distribution obtained by the experiment, the pressure is uniform in a region in which air is introduced from the air intake duct 67 to the head pipe side. Thus, it can be confirmed that the flowing resistance to traveling wind can be suppressed from becoming high by the first and second screen ribs 81 and 82.

While embodiments of the present invention have been described, the present invention is not limited to the embodiments described above but various design alterations are possible without departing from the present invention described in the claims.

DESCRIPTION OF REFERENCE SYMBOLS

11 . . . Front fork
12 . . . Head pipe
19 . . . Engine main body
34 . . . Intake system
40 . . . Front cowl
61 . . . Traveling wind inlet
61a . . . Front end upper edge of traveling wind inlet
61b . . . Front end lower edge of traveling wind inlet
67 . . . Air intake duct
67a . . . Bent portion
67b . . . Lower wall
67c . . . Upper wall
71a . . . Branching portion
72 . . . Outlet
73 . . . Air passage
81, 82 . . . Screen rib serving as dewatering means
83 . . . Traveling wind flowing direction
84 . . . Upright wall
85 . . . Second partition wall serving as partition wall
87 . . . Wall portion serving as upper wall
87a . . . Forwardly inclined wall
87b . . . Rearwardly inclined wall
87c . . . Second curved portion
93 . . . Drain hole
E . . . Internal combustion engine
F . . . Vehicle body frame
WF . . . Front wheel

The invention claimed is:

1. A motorcycle, comprising:
an internal combustion engine having an engine main body;
a vehicle body frame having the engine main body mounted thereupon; and
a front air guide structure, said front air guide structure including a front cowl having a traveling wind inlet thereon, said traveling wind inlet disposed just above a front wheel and supported on the vehicle body frame, and an air intake duct for taking in traveling wind from the traveling wind inlet from a front end thereof extending forwardly from an intake system of the internal combustion engine in such a manner as to form an air passage for guiding the traveling wind to the intake system,
wherein a bent portion which has an upright wall facing forwardly and is bent in an upward and downward direction in such a manner as to assume an upper portion toward the rear is provided at an intermediate portion in a forward and backward direction of the air intake duct,
said front air guide structure further comprising a plurality of dewatering devices configured to be hit from the front by traveling wind and to remove moisture from the traveling wind, said dewatering devices being disposed at a plurality of locations in the air intake duct spaced from each other along the traveling wind flowing direction in the air passage in the front of the upright wall, while an overall extent of a range in which the air passage is visible up to a rear end thereof without obstruction when the air intake duct is viewed from the front of the traveling wind inlet is occupied by the dewatering devices.

2. The motorcycle according to claim 1, wherein said front air guide structure further comprises a second bent portion which has a forwardly inclined wall inclined rearwardly downwardly and facing forwardly and is bent in the upward and downward direction at an upper portion of the air intake duct in the front of the upright wall, wherein the dewatering devices are disposed in the front of the upright wall but in the rear of a front end of the forwardly inclined wall.

3. The motorcycle according to claim 2, wherein the dewatering devices comprise first and second screen ribs extending across the air passage between left and right inner side faces of the air passage, and wherein the screen ribs are spaced from an upper wall and a lower wall of the air passage and are disposed in an offset relationship in the upward and downward direction such that the screen ribs partly overlap with each other as viewed from the traveling wind flowing direction.

4. The motorcycle according to claim 3, wherein the first screen rib which is disposed on the most upstream of the traveling wind flowing direction from between the screen ribs is configured so as to be directed to a drain hole provided at a lower portion of the air intake duct in the front of the upright wall.

5. The motorcycle according to claim 3, wherein the second screen rib which is disposed on the most downstream of the traveling wind flowing direction from between the screen ribs is formed in such a manner as to have a wing-shaped transverse sectional shape extending in the upward and downward direction.

6. The motorcycle according to claim 5, wherein the first and second screen ribs are disposed so as to approach each other in the downward direction, and the upper wall of the air passage has, in a region in which the upper wall corresponds to the screen ribs, the forwardly inclined wall portion disposed above the first screen rib on the upstream side and a rearwardly inclined wall portion extending in a rearwardly upwardly inclined relationship above the second screen rib on the downstream side and connecting at a front end thereof to a rear end of the forwardly inclined wall portion.

7. The motorcycle according to claim 3, wherein the first screen rib which is disposed on the most upstream of the traveling wind flowing direction from between the screen ribs is provided contiguously to a partition wall which connects the lower wall and an upper wall of the air intake duct in such a manner as to partition the air passage leftwardly and rightwardly.

8. The motorcycle according to claim 1, wherein the traveling wind inlet provided on the front cowl is formed such that a front end upper edge thereof is positioned, at the same position in the vehicle widthwise direction, at a position same in the forward and rearward direction as that of a front end lower edge of the traveling wind inlet or at a position in the front of the front end lower edge of the traveling wind inlet.

9. The motorcycle according to claim 1, wherein the air intake duct has, at a rear end portion thereof, a pair of outlets into which the vehicle body frame is branched to the opposite left and right sides at a portion thereof corresponding to a head pipe provided at a front end portion of the vehicle body frame, and the bent portion which has the upright wall and the dewatering devices are disposed in the front of the branching portion of the paired left and right outlets.

10. A motorcycle, comprising:

engine means for providing motive power, said engine means including an engine main body means for supporting engine components therein;

body frame means for supporting motorcycle components, said body frame means having the main body means mounted thereupon; and air guide means for guiding air, said air guide means including cowl means having a traveling wind inlet thereon, said traveling wind inlet disposed just above a front wheel and supported on the body frame means, and intake means for taking in traveling wind from the traveling wind inlet from a front end thereof extending forwardly from an intake system of the engine means in such a manner as to form air passage means for guiding the traveling wind to the intake system, wherein a bent portion which has an upright wall facing forwardly and is bent in an upward and downward direction in such a manner as to assume an upper portion toward the rear is provided at an intermediate portion in a forward and backward direction of the intake means, said air guide means further comprising a plurality of dewatering means for removing moisture from traveling wind, said dewatering means being disposed at a plurality of locations in the intake means spaced from each other along the traveling wind flowing direction in the air passage means in the front of the upright wall, while an overall extent of a range in which the air passage means is visible up to a rear end thereof without obstruction when the air intake means is viewed from the front of the traveling wind inlet is occupied by the dewatering means.

11. The motorcycle according to claim 10, wherein said air guide means further comprises a second bent portion which has a forwardly inclined wall inclined rearwardly downwardly and facing forwardly and is bent in the upward and downward direction at an upper portion of the air intake means in the front of the upright wall, wherein the dewatering means are disposed in the front of the upright wall but in the rear of a front end of the forwardly inclined wall.

12. The motorcycle according to claim 11, wherein the dewatering means comprises first and second screen ribs extending across the air passage means between left and right inner side faces of the air passage means, and wherein the screen ribs are spaced from an upper wall and a lower wall of the air passage means and are disposed in an offset relationship in the upward and downward direction such that the screen ribs partly overlap with each other as viewed from the traveling wind flowing direction.

13. The motorcycle according to claim 12, wherein the first screen rib which is disposed on the most upstream of the traveling wind flowing direction from between the screen ribs is configured so as to be directed to a drain hole provided at a lower portion of the air intake means in the front of the upright wall.

14. The motorcycle according to claim 12, wherein the second screen rib which is disposed on the most downstream of the traveling wind flowing direction from between the screen ribs is formed in such a manner as to have a wing-shaped transverse sectional shape extending in the upward and downward direction.

15. The motorcycle according to claim 14, wherein the first and second screen ribs are disposed so as to approach each other in the downward direction, and the upper wall of the air passage means has, in a region in which the upper wall corresponds to the screen ribs, the forwardly inclined wall portion disposed above the first screen rib on the upstream side and a rearwardly inclined wall portion extending in a rearwardly upwardly inclined relationship above the second screen rib on the downstream side and connecting at a front end thereof to a rear end of the forwardly inclined wall portion.

16. The motorcycle according to claim 12, wherein the first screen rib which is disposed on the most upstream of the traveling wind flowing direction from between the screen ribs is provided contiguously to a partition wall which connects the lower wall and an upper wall of the air intake means in such a manner as to partition the air passage means leftwardly and rightwardly.

17. The motorcycle according to claim 10, wherein the traveling wind inlet provided on the cowl means is formed such that a front end upper edge thereof is positioned, at the same position in the vehicle widthwise direction, at a position same in the forward and rearward direction as that of a front end lower edge of the traveling wind inlet or at a position in the front of the front end lower edge of the traveling wind inlet.

18. The motorcycle according to claim 10, wherein the air intake means has, at a rear end portion thereof, outlet means into which the vehicle body frame is branched to the opposite left and right sides at a portion thereof corresponding to a head pipe provided at a front end portion of the body frame means, and the bent portion which has the upright wall and the dewatering means are disposed in the front of the branching portion of the outlet means.

19. The motorcycle according to claim 18, wherein the outlet means comprises paired left and right outlets.

* * * * *